United States Patent [19]
Kramer et al.

[11] 3,807,293
[45] Apr. 30, 1974

[54] CONVEYOR TYPE OVEN

[75] Inventors: Franklin Kramer, Lexington;
Thomas C. Hayes, Jr., Stoneham;
Loren S. Fernald, Greenwood, all of Mass.; Robert W. Williams, Brookville, L. I., N.Y.

[73] Assignee: Friend Brothers, Inc., Malden, Mass. ; by said Kramer, Fernald and Williams

[22] Filed: Aug. 31, 1972

[21] Appl. No.: 285,538

[52] U.S. Cl. .................. 99/355, 99/443 C, 198/104
[51] Int. Cl. ......................................... A47j 27/122
[58] Field of Search ................. 99/352, 355, 443 C; 198/76, 104, 149

[56] References Cited
UNITED STATES PATENTS
2,201,402   5/1940   Knaust ................................ 99/355
3,736,860   5/1973   Vischer, Jr. ...................... 99/443 C

FOREIGN PATENTS OR APPLICATIONS
111,985   9/1944   Sweden ............................. 198/149

*Primary Examiner*—Edward L. Roberts

[57] ABSTRACT

A baking oven for foods with an endless conveyor and trays attached thereto for inversion at its ends. The trays have pouring lips overlapping except at the conveyor ends. Each tray is shaped to pour its contents upon a baffle without splashing upon the preceding tray. The baffle has deflector means operable to deflect the poured contents to either of two receivers. One receiver is a screw conveyor having a speed related to that of the endless conveyor to retain the contents of successive trays in successive portions of the screw conveyor.

15 Claims, 6 Drawing Figures

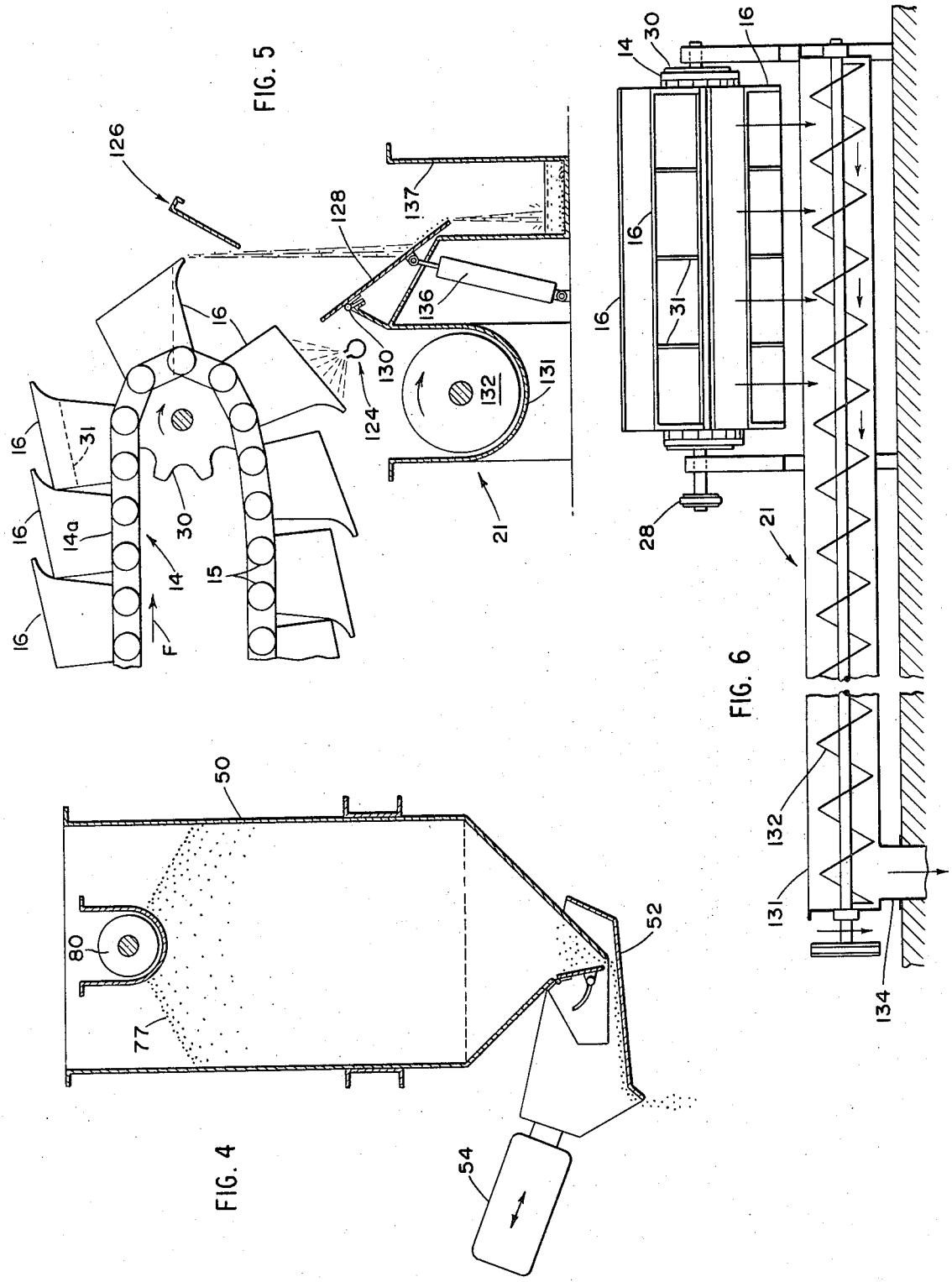

CONVEYOR TYPE OVEN

SUMMARY OF THE INVENTION

Copending application Ser. No. 276,594 filed July 31, 1972, having common disclosure and a common co-inventor with the present application, has been assigned to the same assignee.

This invention relates generally to ovens for cooking foods, and more particularly to continuous batch conveyor ovens suitable for baking or otherwise cooking foods of the fluid or semi-fluid type that may be poured upon emergence from the oven. This includes so-called "slurries," defined for present purposes as dispersions of fragile, particulate food particles in a menstruum. A typical example of a slurry described in detail below is baked beans, although the generality of the invention includes tomato sauce beans, stews, chili, newburgs, and a wide variety of other products having constituents that are lumpy or of appreciable size and vulnerable to crushing or breaking by mechanical action.

The term "baking" as used herein means cooking in dry heat, that is, cooking in which heat is transferred through relatively dry air although sometimes in the presence of a certain amount of water vapor evolved from the cooking vessel or vessels. In the case of baked beans and the like, important objects are to obtain uniformity in the product, to control precisely its color, flavor and texture and to preserve the wholeness of the beans, that is to prevent splitting, crushing or rupture of the fragile skin. It will be obvious that a system suitable for baking such products is also suitable for baking or otherwise cooking so-called "pastes," defined herein as dispersions of comminuted particles in a menstruum, and also any products of a more liquid nature.

More specific objects of this invention relate to the provision of an oven with a continuously moving conveyor having trays thereon, each of which contains a separate batch of the product to be cooked. This affords the possibility of having different products moving through the process at the same time. For example, yellow eye beans, kidney beans and pea beans can be baked in separate batches moving within the oven at the same time.

It is desirable to subject the product to an absolute minimum of physical handling during the movement through the oven, as well as during the delivery of the product from the oven to a conveyor or other means for transport of the product to canning machines or other processing stations.

The baking of beans provides an example of the problems associated with ovens of this type. Prior to entry into an oven, the beans are placed in a sauce with water, the sauce comprising such ingredients as syrup, spice mix including salt, pepper and mustard, and rendered pork. The beans, each of which initially contains a small volume of air, initially tend to float in the menstruum, especially when subjected to heat that expands the air bubble. This tends to cause the beans to rise to the top of the menstruum. As water containing dissolved sugar is absorbed into the bean, the bubble is forced out and ultimately released, a process which is facilitated by any physical movement of the beans that may take place, as by boiling. However, there is a danger that this physical movement will cause the bean to fracture. Typically, a bean absorbs a substantial amount of water which expands the skin and swells the bean. Swelling provides the usual indication of readiness of the bean for baking, but excessive swelling may result in breaking the skin and thereby fracturing the bean. It is important to avoid this result, which in turn requires that the bean be subjected to a minimum of physical handling and only a gentle movement after swelling has occurred.

The baking of beans has long been regarded as a time-consuming process wherein up to a half-day is required to develop optimum color and flavor. It is desirable to reduce the time required for baking to a minimum, without subjecting the beans to any conditions that would tend to degrade the quality of the product. A common prior art procedure has been to soak the beans overnight at room temperatures prior to baking usually in water but sometimes in a concentrated syrup having at least 66 percent solids, such concentration being above the bacteriostatic level. In a typical present-day cannery, the beans will have been cleaned and stored in a dry state prior to this soaking operation. Baking is a batch process carried out in separate, recycled cylindrical aluminum pots fitted with covers. Each pot is loaded with measured quantities of dry beans, sauce consisting of the ingredients previously mentioned, and water. A number of such pots are placed on a rack in a baking oven. Depending upon the oven, the type of fuel and the beans and sauce in use, the baking process may require as long as 11 hours, although progressive refinements of technique have reduced the baking time to as low as seven hours in some cases.

The foregoing baking process must be periodically interrrupted by withdrawal of the rack containing the pots from the oven for watering. This usually occurs between two and six times during the baking process. In the earliest stages the pot covers are typically removed, which allows a substantial amount of water to be lost through evaporation. The purpose of watering is mainly to replace the water so lost, since the beans would scorch if allowed to dry out.

The above-described prior art process presents a number of inherent difficulties that the present invention is intended to overcome. Of considerable importance is the substantial length of the baking time which is reflected not only in fuel costs but also in labor and scheduling problems associated with start-up and shutdown of the baking operation. Another important and related difficulty resides in the necessity for periodic removal of the pots from the oven for watering. Labor is required to open the oven, remove the rack of pots, remove or replace the pot covers, add water to the pots and return them to the oven. Substantial heat is lost from the pots during this operation, and they then require reheating to the boiling temperature each time they are returned to the oven. This substantially slows down the baking process. With this technique it is also difficult to add uniform amounts of water to the pots. Finally, after baking is completed there are difficulties in handling and emptying the pots into the conveyors that feed the canning machinery. The empty pots must also be loaded manually onto conveyors for recycling through washing machinery back to the loading point.

With a view to eliminating all of the foregoing difficulties while preserving the batch mode of cooking, this invention comprises a continuous sequential batch conveyor oven apparatus characterized by a marked reduction in the overall baking time. The beans are brought to boiling temperature very soon after entering the oven and are maintained in the oven until baking is completed. Boiling continues under precisely controlled conditions so that the beans circulate within trays in a gentle and constant manner, being repeatedly subjected to temperatures substantially above boiling near the bottom of the trays, substantially lower temperatures nearer to the top of the trays, and substantially higher temperatures again at the surface where exposed directly to the hot, dry air in the oven. Baking of yellow eye, kidney and pea beans in typical commercial grades of sauce has now been reduced with this apparatus to as low as 3 hours and 20 minutes, with full development of color and flavor and substantial improvement in quality control and the uniformity of product. Substantial additional benefits include greater cleanliness of the baking operation, a reduction in the cost of labor and fuel, and a reduction in the cost of the oven which results from the fact that a given volume of production can be achieved with a smaller oven due to the reduction in baking time.

According to this invention, beans which are described herein merely as an example of one kind of product that may be produced, are baked in open trays captive on a continuous chain conveyor passing through a long oven at atmospheric pressure, the oven being fitted with accurate temperature controls. Periodic watering of each tray is accomplished at spaced stations within the oven without removal of the trays, thereby preventing the loss of heat. The baking time has been reduced in part by certain controls maintained over the concentration of the sugar solution throughout the baking process, combined with coordinated controls over the ambient temperatures within the oven. These controls are designed to take unique advantage of certain properties that have been discovered in a detailed analysis of the entire baking process.

Contrary to prior baking practice, it has now been demonstrated that a substantially faster rate of absorption of reducing sugars and a substantially earlier commencement of the browning reaction can be accomplished by initial dispersion of the beans in a substantially more concentrated sugar solution, preferably near the minimum level to prevent scorching or burning, when combined with the rapid heating of the dispersion in the early stages of baking. Maintenance at precise levels of a high rate of inflow of heat into the beans and a high concentration of sugar in the sauce, i.e., delayed addition of water to the menstruum, also contribute to a faster baking time. Periodic watering by means of spray nozzles in the oven is carried out in steps adapted to maintain the high concentration of the sugar solution in the menstruum throughout a substantial portion of the baking time. Although a somewhat higher early rate of sugar absorption would be expected to result from an elevation in temperature, this consideration alone appears inadequate to explain fully a reduction in overall baking time of the magnitude noted above. A complete explanation is believed to include a number of other novel factors introduced by the embodiment of the baking apparatus and method hereinafter described. The apparatus is so controlled that the beans are subjected to different environmental factors during the course of baking than beans baked by prior methods. Upon completion of baking the product is delivered from the oven by novel means adapted to preserve its physical integrity and to facilitate quantity and quality controls.

BRIEF DESCRIPTION OF THE DRAWINGS

FIG. 4 is a side elevation in section of the bean loading hopper and associated apparatus.

FIG. 5 is a side elevation in section of the oven delivery apparatus.

FIG. 6 is an end elevation of the oven delivery apparatus viewed from the right in FIG. 1.

DETAILED DESCRIPTION

This invention as described below is embodied in the apparatus depicted generally and schematically in FIGS. 1 to 3. This apparatus was initially developed for a commercial baked bean cannery, but it will be recognized that a wide variety of other food products may also be prepared in it.

Figure 1:
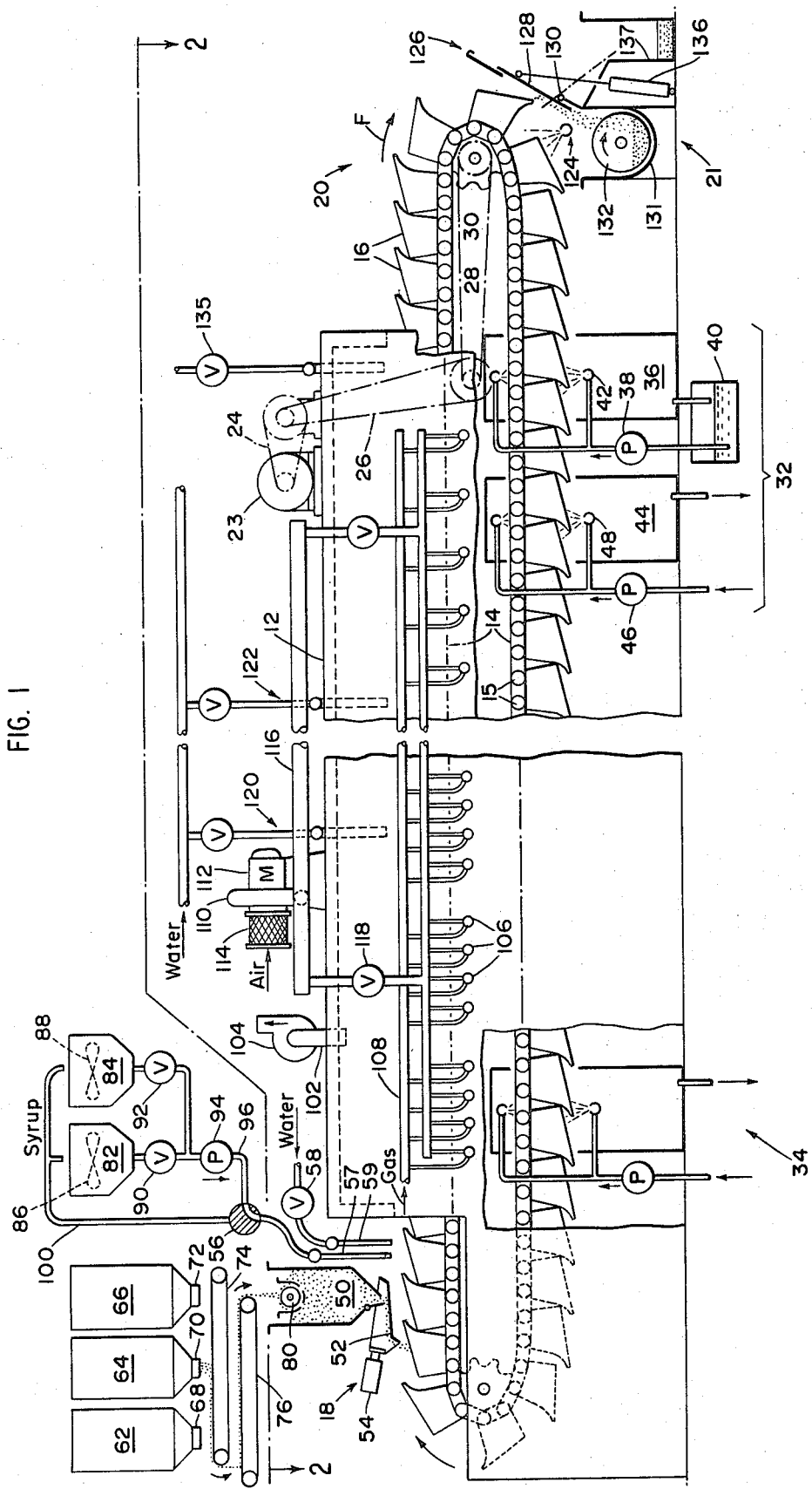
FIG. 1 is a side elevation, partially schematic in form, of a baking oven adapted for carrying out the process of the invention.

An oven 12 approximately 94 feet long and 14 feet wide is fitted with a continuous roller chain conveyor 14 comprising a roller chain on each side with its upper section moving in the direction indicated by an arrow F in FIGS. 1 and 5. As shown in enlarged detail in FIG. 5, each conveyor chain preferably has rollers 15 attached to its links which roll on angle irons (not shown) welded or bolted to the oven walls. A number of trays 16 are each permanently attached to the conveyor links and travel through the oven from a loading position designated generally at 18 to an oven delivery position designated generally at 20, emptying the baked product into a screw conveyor shown generally at 21 and continuously driven by a motor 22. The trays return beneath the oven to the loading position. Preferably, the conveyor 14 is driven at a constant speed sufficient to cause each tray to traverse the oven in about 200 minutes, by a motor 23 driving through speed reducing belts or chains 24, 26 and 28, the belt or chain 28 being connected to drive a sprocket 30 engaging the conveyor 14 at the delivery end.

Referring to FIGS. 1, 5 and 6, the trays are shaped and mounted upon the conveyor 14 in a manner that provides important advantages for their intended use in an oven for fluid or semi-fluid food products. The width or principal dimension of each tray extends transversely of the direction of movement of the conveyor 14 almost the full width of the oven, allowing room at each side for the rollers 15 and angle irons upon which they roll. The front and back walls of the tray are generally parallel and slightly inwardly tapered toward the bottom. The sides are vertical as shown in FIG. 6, and the bottom is somewhat rounded and joined to the front, side and back walls by curved surfaces to facilitate thorough washing and rinsing. Struts 31, which extend only part way from the open top of the tray toward the bottom wall, give added rigidity to the tray.

The sides of the tray have upper edges that are inclined upwardly toward curved pouring lips as viewed in FIG. 5. Each tray is attached to a link such as 14a and therefore tilts as the link tilts in moving over and around the sprocket 30. The dimensions and configurations of the parts are such as to satisfy several conditions. First, as the trays move horizontally within the oven, each tray abuts or nearly abuts the back or front wall of the trays in front of and behind it. This combined with the rectangular shape of the trays makes very efficient use of the available space within the oven. Second, the generally rectangular shape of the trays combined with the rounded shape of their bottoms helps to facilitate circulation of the beans by convection. Third, the pouring lip of each tray extends partially over the tray in front of it to prevent spillage during watering in the oven as hereinafter more fully described. Fourth, as each tray tilts it pours out and discharges its contents without spilling any contents upon the tray in front of it.

Beneath the oven is a tray washing and rinsing station 32 and a heating pre-rinse station 34. A washing unit 36 is provided with a pump 38 for pumping detergent containing water from a vessel 40 to spray nozzles 42. A rinsing unit 44 includes a pump 46 for pumping water to spray nozzles 48. The rinsing unit 34 is similar in construction to the unit 44 and employs hot water.

At the loading end 18 of the oven, measured quantities of beans are loaded into the trays 16 from a hopper 50 with four outlets, respectively associated with four vibrating sheets 52 driven by vibrators 54. The four vibrators are energized simultaneously for loading each tray.

Sauce preheated to approximately 120° F., plus or minus 2°, is delivered to the tray through a three-way valve 56 and a manifold with four nozzles 57, following which water at 180° F., plus or minus 3°, is delivered to the tray by operation of a valve 58 and a manifold with four spray nozzles 59. The water pressure at the valve 58 and all other watering stations is closely maintained by a pressure regulator, not shown. Also, a water meter may be employed as an added check on the amount of water added. The delivery of the beans, sauce and water is accomplished by automatic sequential operation of the vibrators 54, the valve 56 and the valve 58, respectively, for measured lengths of time, by means of suitable timing devices. Because of the close control of temperature and fluid pressures, the ratios of the ingredients added to each tray are accurately controlled.

The beans are delivered to the trays in dry, clean form from one of three hoppers 62, 64 or 66, respectively containing yellow eye, kidney and pea beans. These hoppers contain gating devices 68, 70 and 72, respectively, which dispense the beans upon a continuously moving belt 74. The belt 74 is adapted to drop the beans upon a continuously moving belt 76 which in turn delivers the beans to the hopper 50.

The beans are spread substantially uniformly throughout the length of each tray 16. In order to increase the uniformity of distribution the hopper is provided with a reciprocally drivable screw 80 (FIG. 4) having a substantially horizontal axis and being located so as to spread the beans longitudinally of the hopper from the apex of the pile 77. The screw 80 may be driven in any suitable periodic manner, preferably by a timing device adapted to reverse the direction of rotation.

The sauce is prepared in one of two mixing kettles 82 and 84 respectively provided with paddles 86 and 88. The kettles are respectively provided with outlet valves 90 and 92, both connected to a pump 94. The pump delivers the sauce to a pipe 96 which may be connected selectively by the valve 56 to the nozzles 57 or to a return pipe 100. The mixing kettles are provided with sauce heating means, not shown. Thus the heated sauce is being continuously recirculated to the kettles 82 and 84 to stabilize its viscosity whenever it is not being delivered to the nozzles 57. As stated above, the valve 56 is operated to deliver sauce to the nozzles 57 for a predetermined time period, which results in delivery of a predetermined weight of sauce to each tray.

It will be understood that the loading of successive trays 16 is conducted in a sequential manner by timing devices, whereby each tray is first loaded with a measured weight of beans, then with a measured weight of sauce, and finally with a measured weight of water. This timing sequence is related to the velocity of the conveyor 14 which delivers succeeding trays to the loading positions.

The oven 12 is an elongate closed structure having therein one or more flues such as 102 equipped with blowers 104. The oven is equipped with a plurality of ribbon burners 106, preferably gas-fired. These burners are located beneath the trays, and if desired another set of burners may be installed above the tays. The burners are connected with a gas line 108, preferably in groups, each group being separately thermostatically controlled and comprising a separate zone of the oven 12. The spearate zones are shown in FIG. 3, wherein a zone 1A is the first zone entered and a zone 4 is the last zone reached before the oven delivery end 20. As shown in FIG. 3 the zones have predetermined top and bottom temperatures to accord with the baking requirements of the trays located therein.

The construction and control of the oven is such that the rate of heat inflow to the beans is believed to be greater and more constantly sustained than in the case of prior art methods. The method of controlling the burners within each zone of the oven is described below. A blower 110 is driven by a motor 112 to take in ambient air through a filter 114 and deliver it to an air main 116. The main is connected through a control 118 for the particular zone to the respective burners 106. The control 118 is thermostatically operated and determines the rate of delivery of air to the burners 106, this rate being adapted to control the rate of feeding of gas from the main 108 to the respective burners. Since this part of the apparatus is of conventional construction a more detailed explanation is omitted herein.

At spaced intervals within the oven 12 are located watering stations such as 120, 122 and 124, each fitted with a valve and four spray nozzles similar to the nozzles 59. All of these nozzles are adapted to deliver water at a temperature of 180°, plus or minus 3°, directly into the trays within the oven. This is accomplished by means of two concentric pipes, one within the other, the pipes being separated by an air space sealed by suitable fittings, the inner pipe containing water. As stated above, the water is maintained at an accurately controlled pressure whereby the weight delivered to the trays may be accurately controlled by merely controlling the duration of time that the valves are open.

The trays emerging from the oven are emptied into the screw conveyor 21 over a baffle designated generally at 126 (FIG. 5). A laterally extending diverter panel 128 of this baffle is pivoted at 130 and normally resides in the position illustrated in FIG. 1 for delivery of the baked product to a trough 131 in which is located a screw 132. A chute 134 is located at one end of the trough 131 and delivers the baked product to conveyors leading to canning equipment of a conventional form.

Figures 2, 3:
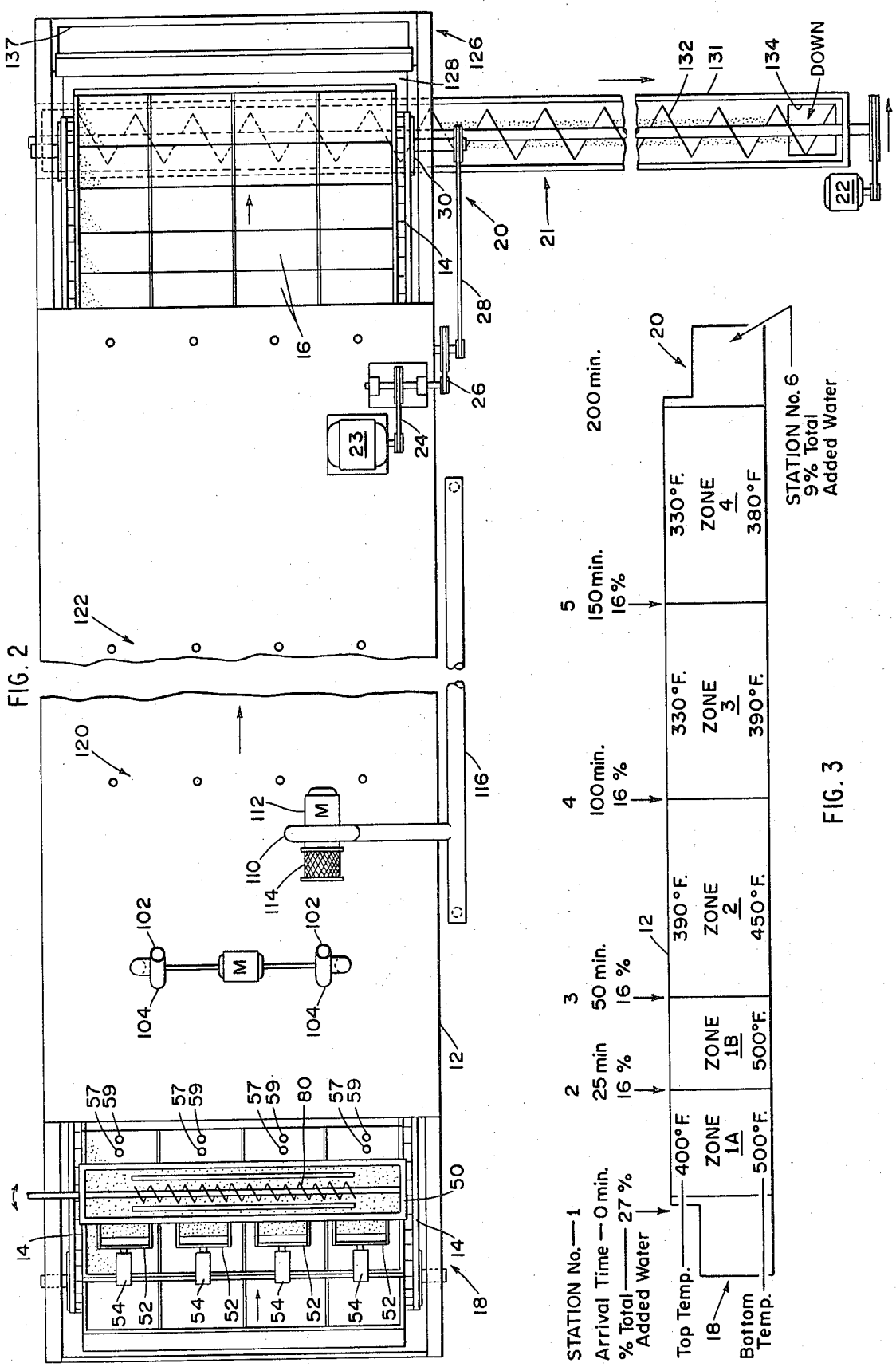
FIG. 2 is a plan view corresponding to FIG. 1.
FIG. 3 is a diagram representing conditions and process steps associated with the several zones of the oven.

FIG. 3 provides a more detailed description of the variables associated with the baking of a typical baked pea bean formulation which is next described. This formulation is assumed to be delivered, after baking, to a specific canning machine adapted to load 16 ounce cans at a given rate. It will be understood that the described amounts and temperatures are varied for baking other kinds of beans or for delivery to canning machines requiring a different rate of delivery. It has been found that by proper adjustment a single speed of the conveyor 14 suffices for all baked bean products in all can sizes.

Since the weight rate of baked product loaded by the assumed canning machine is predetermined, and since the conveyor 14 is driven at a predetermined, constant rate of speed for this canning machine as well for others adapted for loading cans of different sizes, the weight of baked product per tray and consequently the level of the contents in the loaded trays, are therefore predetermined. In the given example, this corresponds to 560 pounds of the baked product per tray as delivered at the oven delivery end 20. The constituents of this baked product are the following: 28 percent or about 155 pounds of beans, 11 percent or about 60 pounds of sauce and 61 percent or about 345 pounds of added water.

At the loading end, the vibrators 54 are operated for 22 to 26 seconds to deliver 155 pounds of dry pea beans per tray. When the tray moves to the proper position the valve 56 is then opened for approximately 28 to 30 seconds to deliver 60 pounds of sauce. Finally, the valve 58 is opened for approximately 26 seconds to deliver 123 pounds of water per tray. This amount of water comprises only about 36 percent by weight of the initial dispersion. Thus the initial water and sauce comprises a menstruum having a relatively high sugar concentration as previously stated.

At spaced stations along the oven such as 120 and 122, water is added to the trays in measured quantities. In the illustrated embodiment there are six watering stations, namely, a station No. 1 at the loading position of the valve 58, stations Nos. 2 to 5 located at spaced positions within the oven, and station No. 6 at the nozzle 124 in position to spray water upwardly at an angle for purging the trays and allowing the contents thereof to fall into the screw conveyor 21. Station No. 2 is located at approximately one-eighth the length of the oven from station No. 1, station No. 3 is located approximately one-quarter the length of the oven from station No. 1, station No. 4 is located at the half-way point, and staion No. 5 is at the three-quarter point, as shown in FIG. 3.

The respective watering stations 1 to 5 are preferably located at the points of separation between adjacent, separately thermostatically controlled oven zones respectively designated 1A, 1B, 2, 3 and 4. The top and bottom temperatures of these oven zones are maintained at the temperatures designated in the drawing.

In the given example, it has been determined by experiment that approximately 110 pounds of water per tray is lost by evaporation during the baking process. Accordingly, the total water to be added to the menstruum can be computed for each tray by taking the weight of the final product (560 pounds in the given case), subtracting the combined weight of the beans and sauce, and adding 110 pounds. In the given example, the total weight of water thus computed is 455 pounds. This total weight is divided between the watering stations as follows: 27 percent at station No. 1, 16 percent at each of stations 2, 3, 4 and 5, and 9 percent at station No. 6.

For kidney or yellow eye beans the total weight of water is computed by the same formula, but its apportionment among the earlier watering stations is preferably increased by one or two percent. The baking time for yellow eye and kidney beans is approximately the same as that for the pea beans described in the above example, as stated above.

It has been previously pointed out that it is important to bring the contents of each tray to a boil as quickly as possible after it enters the oven. This is reflected in the relatively high temperatures prevailing in zones 1A and 1B as indicated by FIG. 3. Initially, each dry bean contains a small quantity of air. When first placed in the water it tends to float to the top and this tendency is increased when the air expands as a result of applied heat. The absorbed water ultimately displaces this air and allows the bean to sink. Since there are no stirrers in the tray, the floating beans would tend to hold other beans close to the bottom of the tray with a consequent tendency to scorch and burn. However, in this oven the dispersion quickly reaches the boiling point and natural convection currents are set up within the tray, thus circulating the beans up from the bottom, a process which is facilitated by the shape of the tray. This tends to create the desired uniformity of dispersion of the beans within the menstruum and assists in dislodging the air from the beans.

Each tray is emptied approximately 7 ½ minutes after it leaves the oven. The screw conveyor 21 is preferably driven continuously at an angular speed equal to the tray width divided by the product of the blade pitch of the screw 132 and the time interval during which a single tray is emptying its contents. Thus in this time interval, the baked product in the conveyor moves a distance equal to one tray width. Except for the first and last trays, each part of the conveyor will contain the same uniform sample of the tray contents as every other part of the conveyor. Thus the delivered product is sufficiently uniform for direct delivery to canning machines.

The oven 12 may be fitted with additional tray loading equipment at designated positions along its length, either at or between the respective watering stations. This equipment may be used to add additional ingredients to the baking product, including ingredients that either require less heating during the baking process, or would become degraded if subjected to the full baking cycle. Thus maple syrup may be added to baked beans by opening a valve 135 as the trays emerge from the oven, as one example. Also, such products as stews, chili and the like may require additional loading stations for particular ingredients.

At certain times when it is desired to gain time for changing from loading one product to loading another or to shut down the oven, the vibrators 54 and valve 56 are turned off and only water is added to the trays. This is for two principal reasons; first, to protect the pots from overheating which might occur if they remain empty in the oven, and second to maintain the conditions within the oven as nearly constant as possible. When such trays reach the oven delivery end 20, a pneumatic plunger 136 (FIG. 5) is energized. This plunger is connected to the diverter panel 128 of the baffle 126 and pivots it to the inclined position shown in FIG. 5 so that as the water is spilled from the tray 16 is falls into a waste trough 137.

It is stated above that the conveyor 14 preferably moves at a constant speed with the volume rate of delivery of product from the oven being adjusted by changing the level of ingredients within the trays. It has been found that the quality of the product is maintained high and constant when changes of level are so made.

It will be apparent that the speed of the conveyor may be adjusted to provide a different baking time for a given product, if desired.

While the invention has been described with reference to a specific example and particular equipment developed for the commercial baking of beans, it will be evident that various other modifications and adaptations may be made consistently with the spirit and scope of the invention, as will be evident to one skilled in the art upon a reading of the foregoing specification.

We claim:

1. Apparatus having, in combination,
   an oven,
   an endless conveyor having sections thereof within and outside the oven,
   a plurality of trays secured to the conveyor for inversion at a delivery position, each tray having a pouring lip overlapping the tray preceding it within the oven,
   means to advance the conveyor through the oven,
   tray loading means adjacent one end of the oven, and
   oven delivery means adjacent the other end of the oven including a baffle, each tray being shaped to pour its contents upon the baffle while inverting without splashing upon the preceding tray.

2. Apparatus according to claim 1, in which the conveyor is a chain driven conveyor and each tray is secured in fixed relation to a link thereof, whereby the tray is inverted when the link tilts, at said delivery position.

3. Apparatus according to claim 2, in which each tray is elongate in a dimension traverse to the direction in which the conveyor advances and the pouring lip extends substantially the full length of said dimension.

4. Apparatus according to claim 1, in which the conveyor is a chain driven conveyor, and the means to advance the conveyor include a sprocket over which the trays are successively inverted and having sufficient diameter to permit the contents of each tray to pour while inverting without splashing upon the preceding tray.

5. Apparatus according to claim 4, in which each tray is secured in fixed relation to a link of the conveyor, whereby the tray is inverted when the link tilts over the sprocket at said delivery position.

6. Apparatus having, in combination,
   an oven,
   an endless conveyor having sections thereof within and outside the oven,
   a plurality of trays secured to the conveyor for inversion at a delivery position, each tray having a pouring lip,
   means to advance the conveyor through the oven,
   tray loading means adjacent one end of the oven, and
   oven delivery means adjacent the other end of the oven including a baffle in position to cause the contents of an inverting tray to fall thereon, said baffle having a diverter panel movable in relation thereto to deflect said contents to either of two receivers.

7. Apparatus according to claim 6, in which the baffle is downwardly inclined toward the loading means.

8. Apparatus according to claim 7, in which the diverter panel is pivotal on a generally horizontal axis to a predetermined position for deflecting contents falling on the baffle above it to a receiver on the side of the baffle opposite to the conveyor.

9. Apparatus according to claim 8, in which said predetermined position is downwardly inclined away from the loading means.

10. Apparatus having, in combination,
    an oven,
    an endless conveyor having sections thereof within and outside the oven,
    a plurality of trays secured to the conveyor for inversion at a delivery position,
    means to move the conveyor through the oven,
    tray loading means adjacent one end of the oven, and
    oven delivery means adjacent the other end of the oven including a screw conveyor having its principal axis at an angle to the direction of travel of the endless conveyor.

11. Apparatus according to claim 10, with means to rotate the screw conveyor at a speed proportional to the velocity of the endless conveyor.

12. Apparatus according to claim 11, in which the screw conveyor has a screw with a given pitch, the product of said pitch, the angular velocity of the screw and a time period during which a single tray is inverting being substantially equal to the dimension of said tray transverse to its direction of movement.

13. Apparatus having, in combination,
    an oven,
    an endless conveyor having sections thereof within and outside the oven,
    a plurality of trays secured to the conveyor for inversion at a delivery position to pour out the contents thereof,
    means to advance the conveyor through the oven,
    tray loading means adjacent one end of the oven,
    oven delivery means adjacent the other end of the oven including a second conveyor moving in a direction intersecting the path of travel of the endless conveyor beneath the inverting trays, and deflector means between said inverting trays and second conveyor and movable to deflect the poured contents into or away from said second conveyor.

14. Apparatus according to claim 13, in which the second conveyor is a screw conveyor with means to rotate the screw conveyor at a speed proportional to the velocity of the endless conveyor.

15. Apparatus according to claim 13, in which the oven is divided into a plurality of sections, each section having an independent thermostatic temperature control.

* * * * *